(12) United States Patent
Yin

(10) Patent No.: US 12,442,537 B1
(45) Date of Patent: Oct. 14, 2025

(54) BRAZIER LID AND BRAZIER

(71) Applicant: Bluewise INC, Dover, DE (US)

(72) Inventor: Aicheng Yin, Shenzhen (CN)

(73) Assignee: Bluewise INC

( * ) Notice: Subject to any disclaimer, the term of this patent is extended or adjusted under 35 U.S.C. 154(b) by 0 days.

(21) Appl. No.: 19/055,555

(22) Filed: Feb. 18, 2025

(30) Foreign Application Priority Data

Feb. 10, 2025 (CN) .......................... 202520208134.6

(51) Int. Cl.
*F24C 15/36* (2006.01)
*F24C 15/12* (2006.01)

(52) U.S. Cl.
CPC ................................... *F24C 15/12* (2013.01)

(58) Field of Classification Search
CPC ...................................................... F24C 15/12
USPC ......................................................... 126/220
See application file for complete search history.

(56) References Cited

U.S. PATENT DOCUMENTS

| | | | | |
|---|---|---|---|---|
| 5,809,989 | A * | 9/1998 | Nelson | A62C 3/00 135/147 |
| D457,229 | S * | 5/2002 | Chen | D23/343 |
| 7,383,836 | B2 * | 6/2008 | Klemming | F24B 1/181 126/190 |
| D579,261 | S * | 10/2008 | Chiang | D7/332 |
| 9,307,865 | B1 * | 4/2016 | Silva | A47J 37/07 |
| 2004/0255930 | A1 * | 12/2004 | Klemming | F24B 1/182 126/506 |
| 2019/0380534 | A1 * | 12/2019 | Patterson | B62B 1/18 |

* cited by examiner

*Primary Examiner* — Avinash A Savani
(74) *Attorney, Agent, or Firm* — JEEN IP LAW, LLC

(57) ABSTRACT

The application provides a brazier lid and a brazier. The brazier comprises a brazier lid and a brazier body. The brazier lid covers the brazier body and comprises a first assembly, a second assembly, a third assembly and a fourth assembly. The first assembly, the second assembly, the third assembly and the fourth assembly are detachably connected. In use, the first assembly, the second assembly, the third assembly and the fourth assembly are assembled together. In the transportation and storage process, the first assembly, the second assembly, the third assembly and the fourth assembly are stacked together to save space and be carried easily.

5 Claims, 15 Drawing Sheets

031  033  035  037
03

BRAZIER LID AND BRAZIER

CROSS-REFERENCE TO RELATED APPLICATIONS

This application claims priority to Chinese Patent Application No. 202520208134.6, filed on Feb. 10, 2025, which is hereby incorporated by reference in its entirety.

TECHNICAL FIELD

The disclosure relates to the technical field of braziers, and particularly, relates to a brazier lid and a brazier.

BACKGROUND

Braziers, as common heating equipment, are mainly used for outdoor barbecuing and dining, heating in winter, food heating and other application scenarios. In the technical field of existing braziers, combustible fuels (such as wood and charcoal) are added into a combustion chamber, and some air passages for facilitating combustion are designed to allow the fuels in the combustion chamber to be burnt to generate flames for use.

With the burning of the flames in the combustion chamber, a large quantity of ash or unburnt debris will be generated in the fuel burning process, causing trouble for users. For example, the generated ash is not beneficial to environmental protection and will exert an adverse impact on human respiratory tracts and even cause respiratory diseases in serious cases. For another example, the unburnt debris will easily lead to a fire if it drifts out of braziers.

In view of the above technical problems, in the technical field of existing braziers, a brazier lid is added to the braziers to block ash or unburnt debris, such that the ash or unburnt debris will not drift out of the braziers, thus avoiding personal injuries or material damage.

However, in actual use, existing brazier lids have an excessively large size and thus cannot be carried easily. Particularly, in the sales process, to ensure that the shape of the brazier lids matches the shape of braziers, the brazier lids generally have a large size, thus being inconvenient to transport and store.

SUMMARY

A brazier lid is used for covering a brazier body and comprises: a first assembly, comprising: a first frame unit, comprising: a first bottom edge frame; and a first side edge frame, the first bottom edge frame and the first side edge frame being connected to form a first area; and a first mesh unit, the first mesh unit being arranged in the first area, and an edge of the first mesh unit being connected to the first frame unit; and a second assembly, comprising: a second frame unit, comprising: a second bottom edge frame; a second side edge frame, the second bottom edge frame and the second side edge frame being connected to form a second area; and a second mesh unit, the second mesh unit being arranged in the second area, and an edge of the second mesh unit being connected to the second frame unit; wherein, the first side edge frame and the second side edge frame are arranged opposite to each other and detachably connected to realize detachable connection between the first assembly and the second assembly;

A brazier comprises: a brazier lid, being used for covering the brazier and comprising: a first assembly, comprising: a first frame unit, comprising: a first bottom edge frame; and a first side edge frame, the first bottom edge frame and the first side edge frame being connected to form a first area; and a first mesh unit, the first mesh unit being arranged in the first area, and an edge of the first mesh unit being connected to the first frame unit; a second assembly, comprising: a second frame unit, comprising: a second bottom edge frame; and a second side edge frame, the second bottom edge frame and the second side edge frame being connected to form a second area; and a second mesh unit, the second mesh unit being arranged in the second area, and an edge of the second mesh unit being connected to the second frame unit; the first side edge frame and the second side edge frame being arranged opposite to each other and detachably connected to realize detachable connection between the first assembly and the second assembly; and a brazier body, comprising: side walls, a cylindrical space being defined by the side walls; and a bottom, the bottom being connected to lower edges of the side walls, and a combustion area being defined by the bottom and the side walls; wherein, an open smoke outlet area is defined by upper portions of the side walls; the brazier lid covers the open smoke outlet area defined by the upper portions of the side walls and is detachably connected to the brazier body. The first bottom edge frame and the second bottom edge frame are connected end-to-end to form a plane; in an extension direction away from the brazier body, an area of the plane decreases gradually.

The first bottom edge frame and the second bottom edge frame are connected end-to-end to form a plane; in an extension direction close to the second side edge frame and the first side edge frame, an area of the plane decreases gradually.

The first assembly comprises: a first horizontal edge frame, connected to the first side edge frame; wherein, a first flat surface is defined by the first side edge frame and the first horizontal edge frame; a first side surface is defined by the first bottom edge frame, the first side edge frame and the first horizontal edge frame; positions of the first flat surface and the first side surface overlap with a position of the first mesh unit.

The first side surface is a flat surface or a curved surface.

The brazier lid further comprises a handle arranged on the first bottom edge frame, the first side edge frame or the first horizontal edge frame.

An included angle is formed between the first flat surface and the first side surface along the first horizontal edge frame, and the included angle ranges from 90° to 180°.

The brazier lid further comprises: a third assembly, comprising: a third frame unit, comprising: a third bottom edge frame and a third side edge frame, the third bottom edge frame and the third side edge frame being connected to form a third area; and a third mesh unit arranged in the third area, an edge of the third mesh unit being connected to the third frame unit; wherein, the third side edge frame, the first side edge frame and the second side edge frame are detachably connected to realize detachable connection between the first assembly, the second assembly and the third assembly.

The brazier lid further comprises a fourth assembly, comprising: a fourth frame unit, comprising: a fourth bottom edge frame and a fourth side edge frame, the fourth bottom edge frame and the fourth side edge frame being connected to form a fourth area; and a fourth mesh unit arranged in the fourth area, an edge of the fourth mesh unit being connected to the fourth frame unit; wherein, the first side edge frame, the second side edge frame, the third side edge frame and the forth side edge are detachably connected to realize detachable connection between the first assembly, the second assembly, the third assembly and the forth assembly.

BRIEF DESCRIPTION OF DRAWINGS

To gain a further understanding of the disclosure, accompanying drawings are provided below and constitute one part of the disclosure. Illustrative embodiments of the disclosure and descriptions thereof are used to explain the disclosure and should not be construed as improper limitations of the disclosure. Specific embodiments of the disclosure are described in detail below with reference to the accompanying drawings for the purpose of illustration rather than restriction. Identical reference signs in the accompanying drawings indicate identical or similar components or portions. Those skilled in the art should understand that these accompanying drawings are not definitely plotted in scale. Wherein.

DESCRIPTION OF EMBODIMENTS

Figure 1:
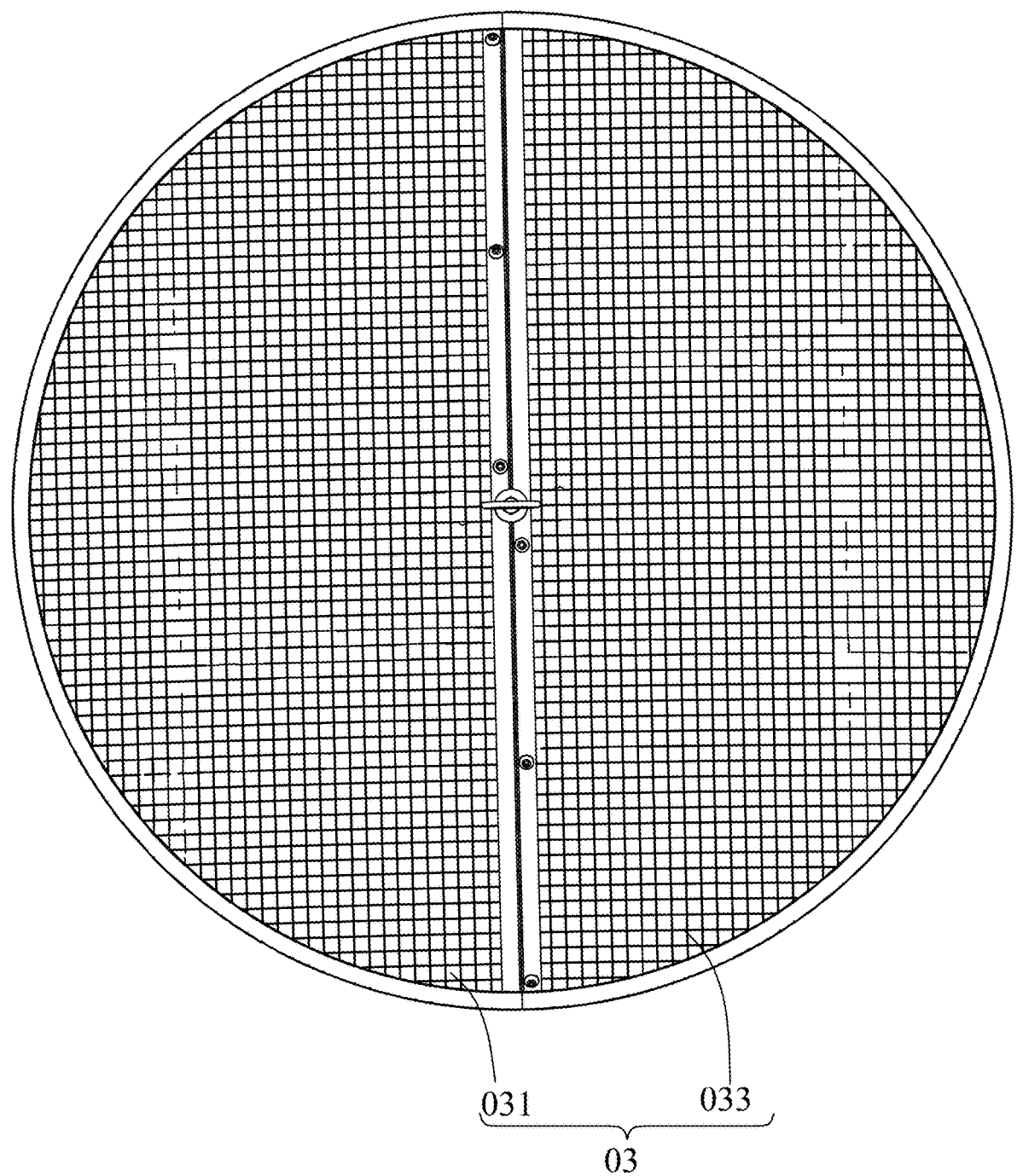
FIG. 1 is a structural diagram of a brazier lid from a first perspective according to the application.

The technical solutions in the embodiments of the disclosure will be clearly and completely described below in conjunction with accompanying drawings of these embodiments. Obviously, the embodiments described below are merely illustrative ones, and are not all possible ones of the disclosure. All other embodiments obtained by those ordinarily skilled in the art according to the following ones without creative labor should also fall within the protection scope of the disclosure.

It should be noted that all directional indicators (such as "upper", "lower", "left", "right", "front" and "back") in the embodiments of the disclosure are merely used to explain the relative positional relations and motions between components at a specific attitude, and once the specific attitude changes, these directional indications will change accordingly.

In addition, descriptions such as "first" and "second" involved in the disclosure are merely used for the purpose of description and should not be construed as indicating or implying relative importance or implicitly indicating the number of technical features referred to. Therefore, a feature defined by "first" or "second" may explicitly or implicitly indicate the inclusion of one said feature. In the description of the disclosure, "multiple" refers to at least two, such as two or three, unless otherwise expressly and specifically defined.

In the disclosure, unless otherwise expressly stated and defined, terms such as "connect" and "fix" should be broadly understood. For example, "connect" may refer to fixed connection, detachable connection or integrated connection; mechanical connection or electrical connection; direct connection, indirect connection by means of an intermediate medium, or internal connection or interaction between two elements. Those ordinarily skilled in the art can appreciate the specific meanings of these terms in the disclosure as the case may be.

In addition, the technical solutions in the embodiments of the disclosure may be combined as long as they can be implemented by those ordinarily skilled in the art. When a combination of the technical solutions causes a conflict or cannot be implemented, this combination should be construed as non-existent and should not fall within the protection scope of the disclosure.

Referring to structural diagrams of a brazier provided by the application, the brazier comprises a brazier lid 03 and a brazier body. The brazier lid 03 covers the brazier body, wherein the shape of the brazier body is not specifically limited, and the brazier body may in a hollow cylindrical shape, a hollow polygonal shape, a hollow oval shape, a hollow irregular shape, or the like. In a preferred embodiment of the application, the brazier body 05 is in a cylindrical shape. The brazier lid 03 and the brazier body are detachably connected by threaded connection, snap fit or clamping. Of course, the brazier lid 03 may be directly placed on the brazier body, such that the brazier lid 03 can be separated from the brazier body at any time in use, and users can handle the brazier body and the brazier lid 03 separately in use of the brazier. In a preferred embodiment of the application, the brazier lid 03 is directly placed on the brazier body.

Wherein, the brazier body comprises side walls and a bottom, wherein the side walls are connected end-to-end to define a cylindrical space in a fixed shape, and the cylindrical space is provided with a vertical through-hole; the bottom is connected to lower edges of the side walls. In this way, a receiving space with an opening is defined by the side walls and the bottom and used as a combustion area where fuels in the brazier are burnt; and the opening is formed by upper portions of the side walls and used for discharging smoke generated in the burning process of the fuels.

Wherein, the side walls and the bottom are fixedly connected by welding, riveting, threaded connection, fixed clamping, interference fit, or other methods. In a preferred embodiment of the application, the side walls are welded to the bottom, such that the positions of the side walls and the bottom are fixed and the side walls and the bottom will not move relatively in the burning process. In actual use, fuels are burnt in the combustion area, and ash or unburnt sparks generated in the fuel burning process may drift with the wind. By covering the brazier body with the brazier lid, the ash or unburnt sparks can be blocked by the brazier lid to avoid an accidental outdoor fire.

Figure 2:
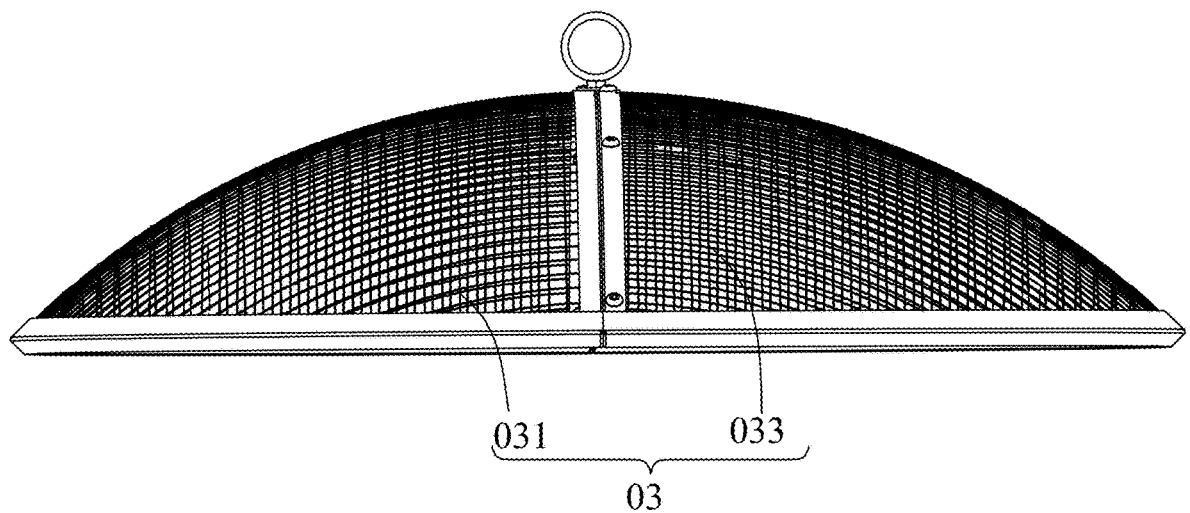
FIG. 2 is a structural diagram of the brazier lid from a second perspective according to the application.
Figure 3:
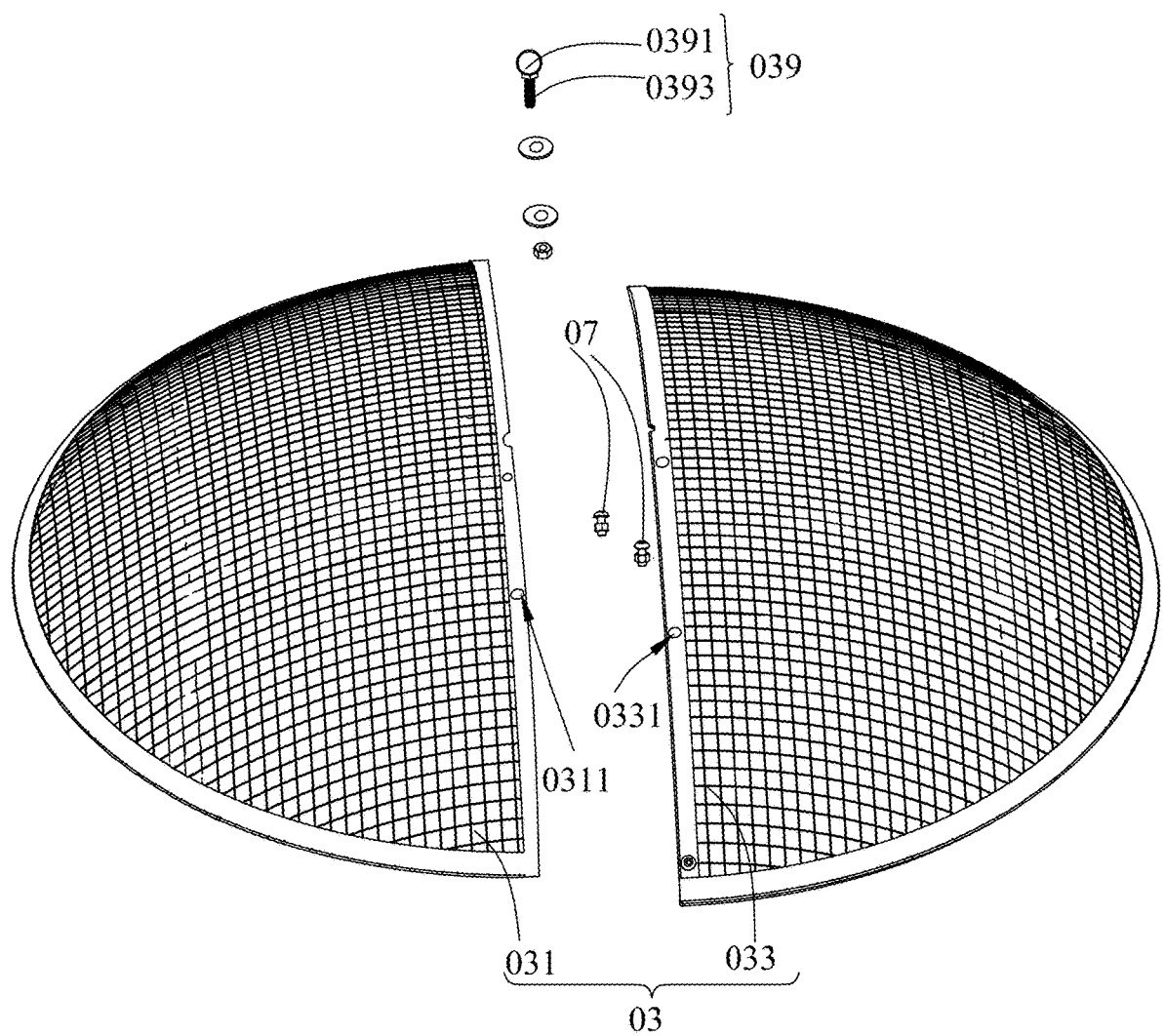
FIG. 3 is a structural diagram of the brazier lid in a disassembled state according to the application.

Refer to FIGS. 1, 2 and 3, wherein FIG. 1 is a structural diagram of a brazier lid from a first perspective according to the application, FIG. 2 is a structural diagram of the brazier lid from a second perspective according to the application, and FIG. 3 is a structural diagram of the brazier lid in a disassembled state according to the application.

The brazier lid 03 comprises a first assembly 031 and a second assembly 033, wherein the first assembly 031 and the second assembly 033 are assembled together. In some embodiments, in the assembly process of the first assembly 031 and the second assembly 033, the first assembly 031 and the second assembly 033 are connected by means of some connecting components. For example, a plurality of first through-holes 0311 are formed in the first assembly 031, second through-holes 0331 are formed in the second assembly 033, the first through-holes 0311 correspond to the second through-holes 0331 in position, and external screws 07 sequentially penetrate through the first through-holes 0311 and the second through-holes 0331 to assemble together the first assembly 031 and the second assembly 033.

Figure 4:
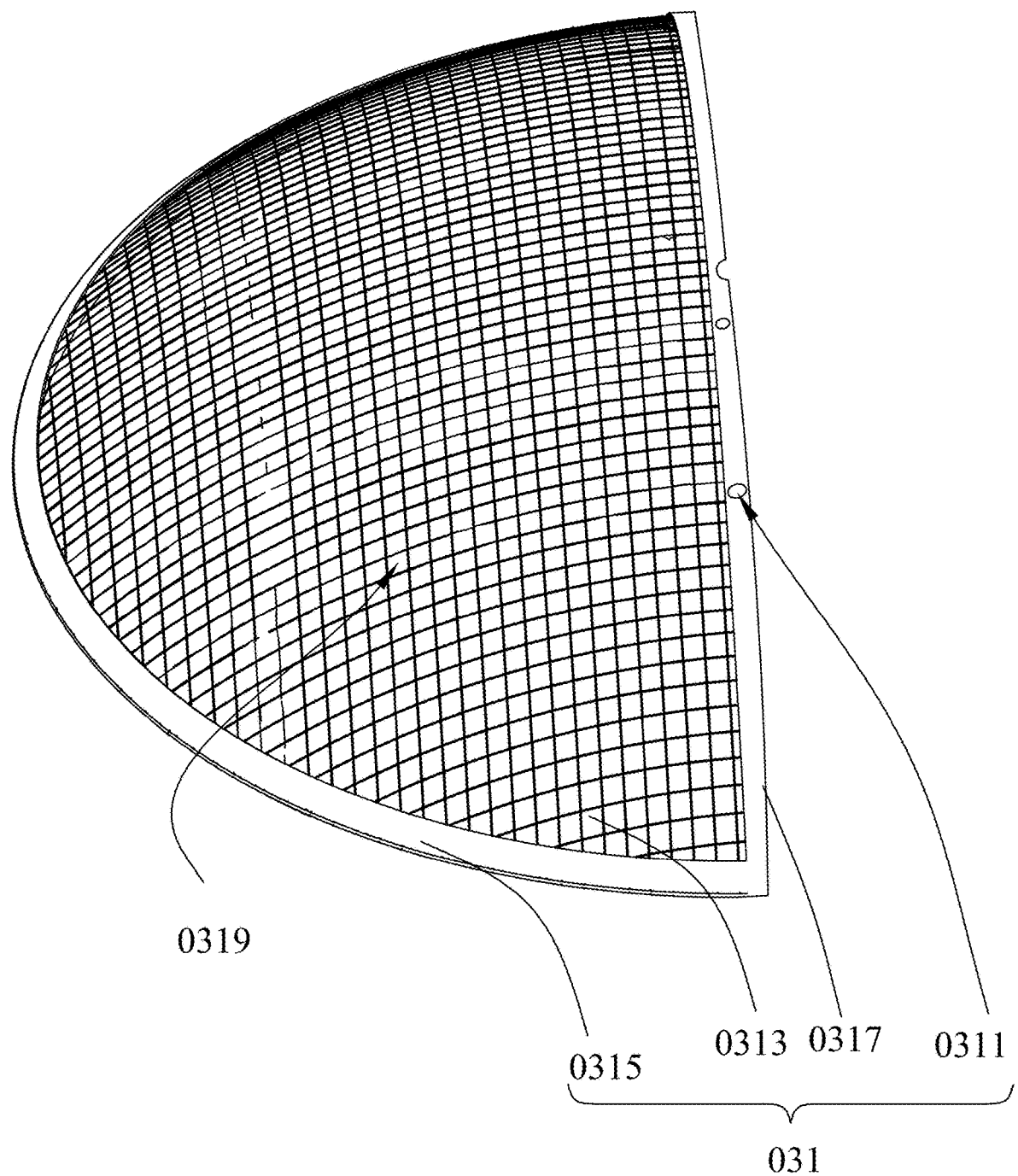
FIG. 4 is a structural diagram of a first assembly shown in FIG. 1.

Refer to FIG. 4 which is a structural diagram of the first assembly shown in FIG. 1.

The first assembly 031 comprises a first mesh unit 0313 and a first frame unit, wherein the first frame unit may be divided into a first bottom edge frame 0315 and a first side edge frame 0317, the first bottom edge frame 0315 and the first side edge frame 0317 are connected to form a first area 0319, the first mesh unit 0313 is arranged in the first area 0319, an edge of the first mesh unit 0313 is connected to the first frame unit, and specifically, an outer edge of the first mesh unit 0313 is surrounded by the first bottom edge frame 0315 and the first side edge frame 0317. Wherein, the first bottom edge frame 0315 and the first side edge frame 0317 may be connected by welding, riveting, threaded connection, fixed clamping, interference fit or other methods. The first bottom edge frame 0315 and the first side edge frame 0317 are connected by any one of these methods to surround the first mesh unit 0313. In a preferred embodiment of the application, the first bottom edge frame 0315 and the first side edge frame 0317 are welded together, and the first bottom edge frame 0315 and the first side edge frame 0317 may be welded to the first mesh unit 0313.

Wherein, the first mesh unit 0313 surrounded by the first bottom edge frame 0315 and the first side edge frame 0317 may be planar, and in this case, a planar frame is formed by the first bottom edge frame 0315 and the first side edge frame 0317. In addition, the first mesh unit 0313 may be curved, and in this case, a curved frame is formed by the first bottom edge frame 0315 and the first side edge frame 0317. In addition, the first mesh unit 0313 may be configured as other irregular curved or planar structures, which will not be enumerated here.

Wherein, in this embodiment, the first mesh unit 0313 is configured as a mesh structure and fills in the first area 0319 by means of interwoven meshes, such that a filter mesh is formed in the first area 0319; a plurality of filter holes 0318 are formed in the filter mesh, wherein the filter holes 0318 may be triangular, circular, quadrilateral, pentagonal, hexagonal or in irregular shapes, which will not be enumerated here. In this embodiment, the filter holes 0318 are quadrilateral.

Figure 5:
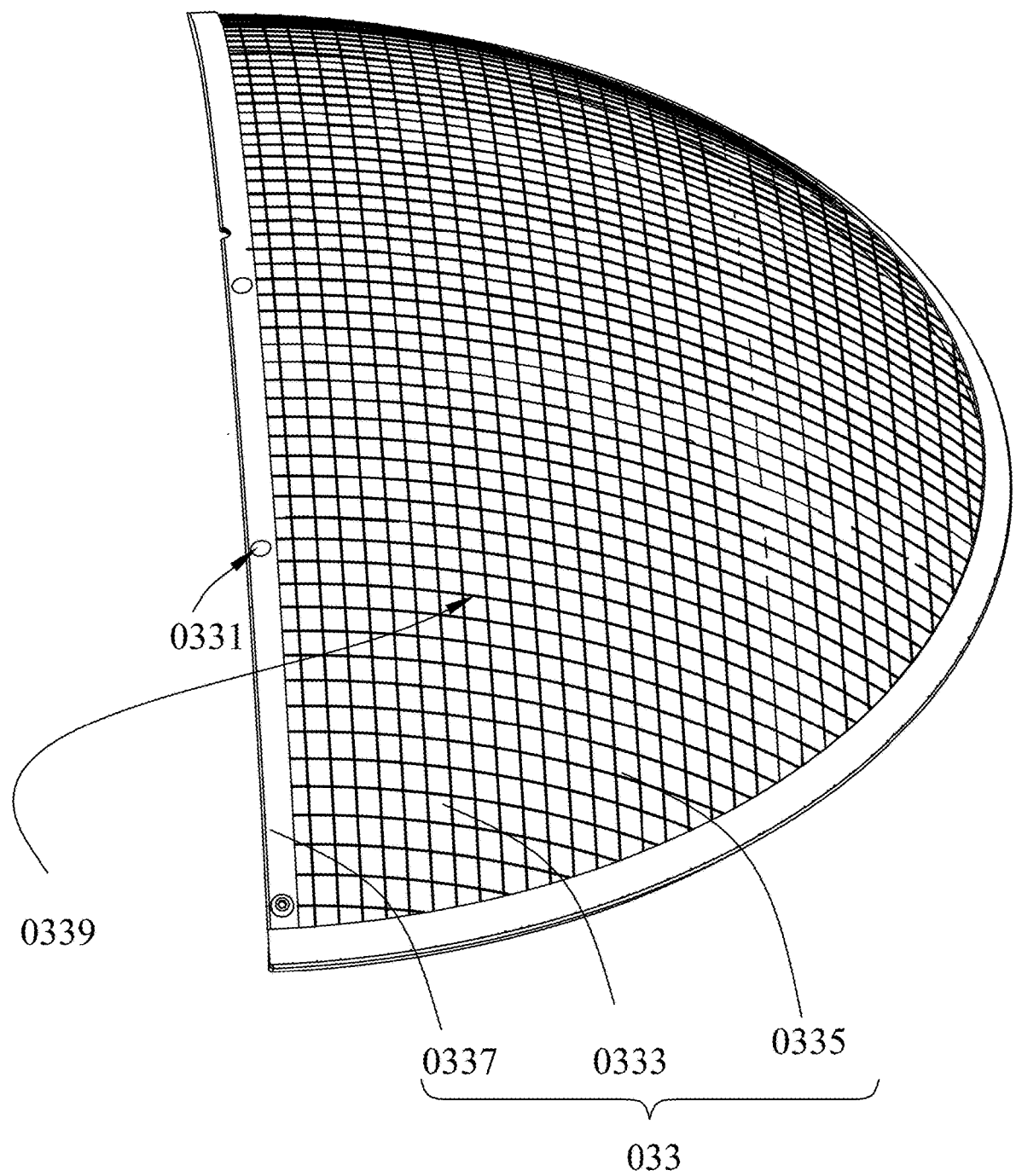
FIG. 5 is a structural diagram of a second assembly shown in FIG. 1.

Refer to FIG. 5 which is a structural diagram of the second assembly shown in FIG. 1.

The second assembly 033 comprises a second mesh unit 0333 and a second frame unit, wherein the second frame unit may be divided into a second bottom edge frame 0335 and a second side edge frame 0337, the second bottom edge frame 0335 and the second side edge frame 0337 are connected to form a second area 0339, the second mesh unit 0333 is arranged in the second area 0339, an edge of the second mesh unit 0333 is connected to the second frame unit, and specifically, an outer edge of the second mesh unit 0333 is surrounded by the second bottom edge frame 0335 and the second side edge frame 0337. Wherein, the second bottom edge frame 0335 and the second side edge frame 0337 may be connected by welding, riveting, threaded connection, fixed clamping, interference fit or other methods. The second bottom edge frame 0335 and the second side edge frame 0337 are connected by any one of these methods to surround the second mesh unit 0333. In a preferred embodiment of the application, the second bottom edge frame 0335 and the second side edge frame 0337 are welded together, the second bottom edge frame 0335 and the second side edge frame 0337 may be welded to the second mesh unit 0333, welds are arranged on edges of the second bottom edge frame 0335, the second side edge frame 0337 and the second mesh unit 0333, and the second bottom edge frame 0335, the second side edge frame 0337 and the second mesh unit 0333 are welded together by electric welding.

Wherein, the second mesh unit 0333 surrounded by the second bottom edge frame 0335 and the second side edge frame 0337 may be planar, and in this case, a planar frame is formed by the second bottom edge frame 0335 and the second side edge frame 0337. In addition, the second mesh unit 0333 may be curved, and in this case, a curved frame is formed by the second bottom edge frame 0335 and the second side edge frame 0337. In addition, the second mesh unit 0333 may be in other irregular curved or planar shapes, which will not be enumerated here. In this embodiment, the second mesh unit 0333 is curved and fills in the second area 0339 by means of interwoven meshes, such that a filter mesh is formed in the second area 0339; a plurality of filter holes 0338 are formed in the filter mesh. In this embodiment, the filter holes 0318 are quadrilateral. Of course, the filter holes 0318 may be triangular, circular, quadrilateral, pentagonal, hexagonal or in irregular shapes, which will not be enumerated here.

Referring to FIGS. 1, 2, 3, 4 and 5, when the brazier lid 03 is assembled, the first side edge frame 0317 and the second side edge frame 0337 are arranged opposite to each other and detachably connected to realize detachable connection between the first assembly 031 and the second assembly 033. A plurality of first through-holes 0311 are formed in the first side edge frame 0317, second through-holes 0331 are formed in the second side edge frame 0337, the first through-holes 031 correspond to the second through-holes 0331 in position, and external screws 07 sequentially penetrate through the first through-holes 0311 and the second through-holes 0331 to assemble together the first assembly 031 and the second assembly 033. Wherein, the first bottom edge frame 0315 and the second bottom edge frame 0335 are connected end-to-end to define a plane, which is approximately a circular plane; in an extension direction close to the second side edge frame 0337 and the first side edge frame 0317, the area of the plane decreases gradually; in other words, in an extension direction away from the brazier body 05, the area of the plane decreases gradually. Wherein, the area may decrease gradually to be close to zero or a non-zero fixed value finally.

Referring to FIG. 2, the area decreases gradually to be close to zero, and in this case, the whole brazier lid 03 is approximately hemispherical, wherein the second area 0339 and the first area 0319 are both curved.

Figure 6:
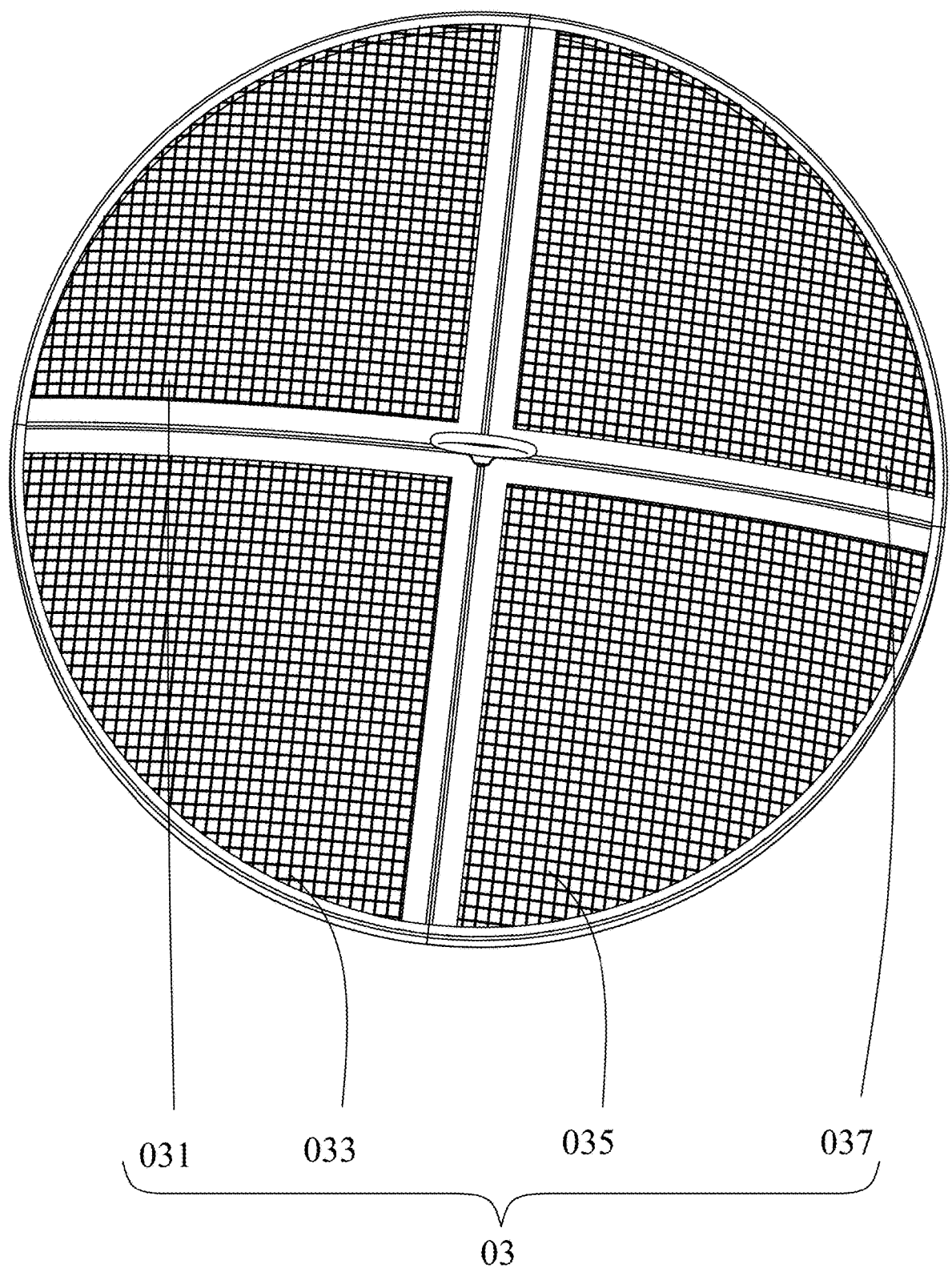
FIG. 6 is a structural diagram of the brazier lid from a first perspective according to the application.
Figure 7:
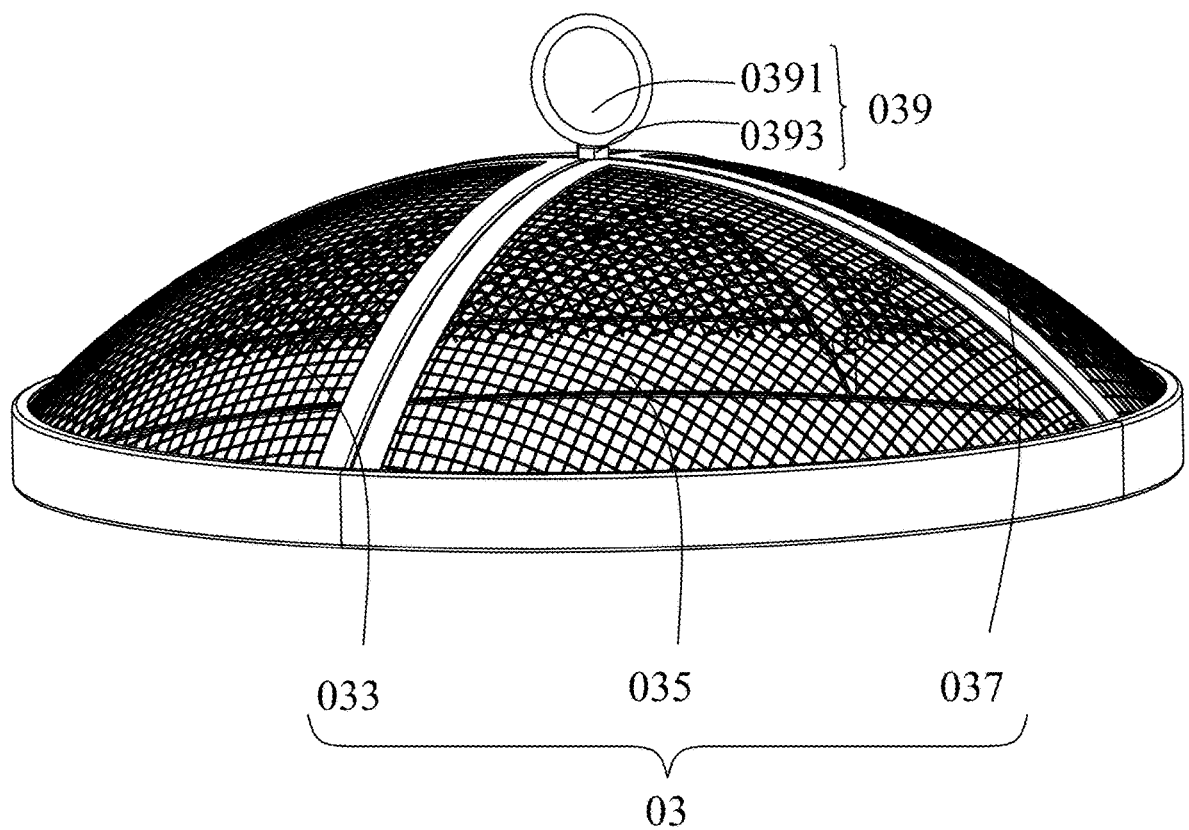
FIG. 7 is a structural diagram of the brazier lid from a second perspective according to the application.
Figure 8:
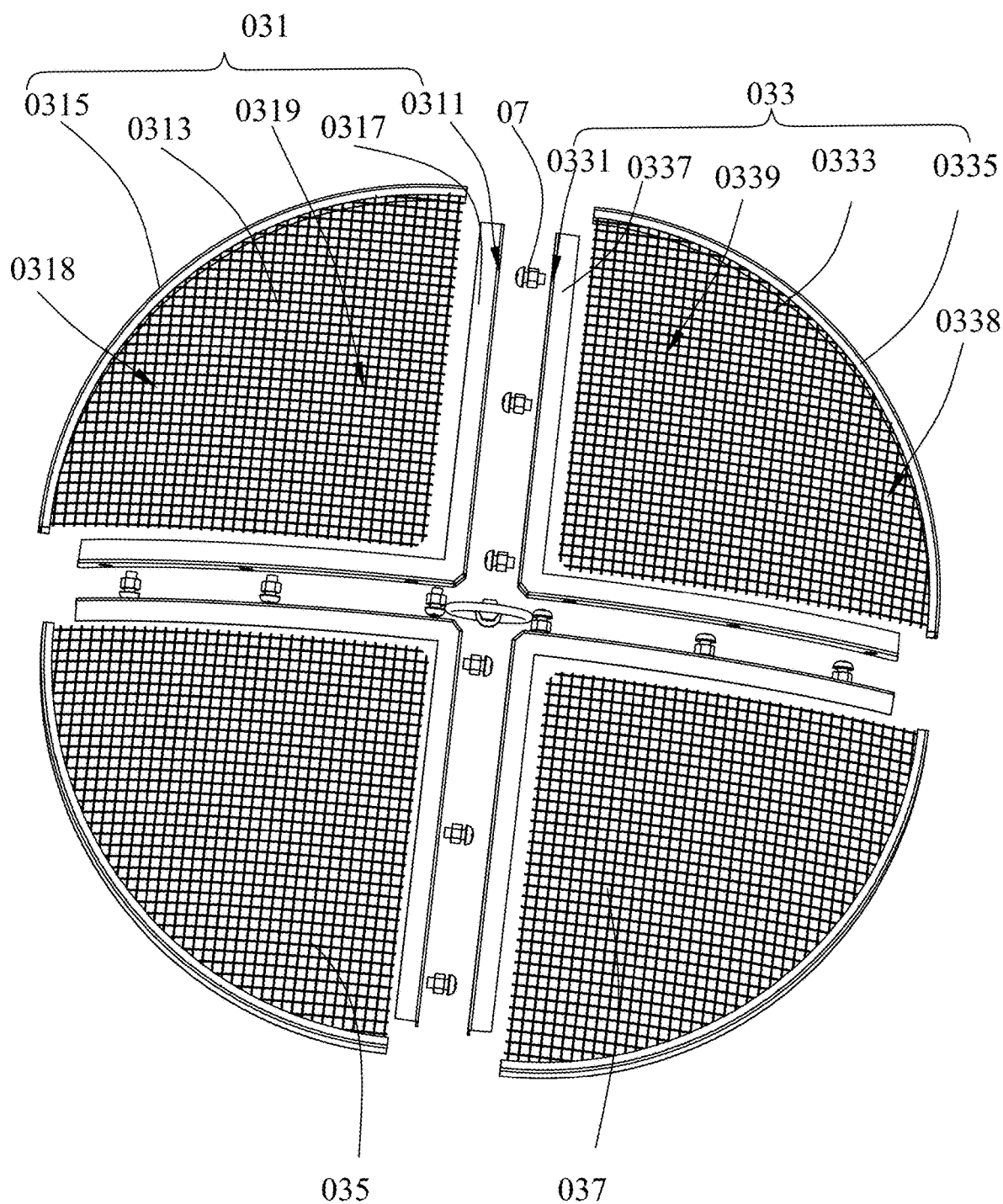
FIG. 8 is a structural diagram of the brazier lid in a disassembled state according to the application.

Refer to FIGS. 6, 7 and 8, wherein FIG. 6 is a structural diagram of the brazier from a first perspective according to the application, FIG. 7 is a structural diagram of the brazier lid from a second perspective according to the application, and FIG. 8 is a structural diagram of the brazier lid in a disassembled state according to the application.

In this embodiment, the shape of the brazier lid 03 is almost the same as the shape of the brazier lid 03 shown in FIGS. 1, 2 and 3, but the number of assemblies of the brazier lid 03 is four rather than two, and the brazier lid 03 comprises a first assembly 031, a second assembly 033, a third assembly 035 and a fourth assembly 037. That is to say, in FIGS. 1, 2 and 3, in the assembly process of the first assembly 031 and the second assembly 033, the first assembly 031 and the second assembly 033 have basically the same size and form a bottom surface and a top surface jointly, and each of the first assembly 031 and the second assembly 033 accounts for half of the top surface, that is, the angle of the first assembly 031 and the angle of the second assembly 033 are respectively 180°. In this embodiment, in the assembly process of the first assembly 031, the second assembly 033, the third assembly 035 and the fourth assembly 037, each of the first assembly 031, the second assembly 033, the third assembly 035 and the fourth assembly 037 accounts for a quarter of the top surface, and the angle of the first assembly 031, the angle of the second assembly 033, the angle of the third assembly 035 and the angle of the fourth assembly 037 are respectively 90°.

In this embodiment, each of the first assembly 031 and the second assembly 033 only accounts for a quarter of the whole brazier lid 03. In the embodiment shown in FIGS. 1-5, each of the first assembly 031 and the second assembly 033 accounts for half of the whole brazier lid 03. In these two embodiments, the first assembly 031 and the second assembly 033 are different merely in size and identical in structure. Therefore, the first assembly 031 and the second assembly 033 shown in FIG. 8 are almost identical with the first assembly 031 and the second assembly 033 shown in FIGS. 1-5, so literal descriptions will not be repeated here.

Figure 9:
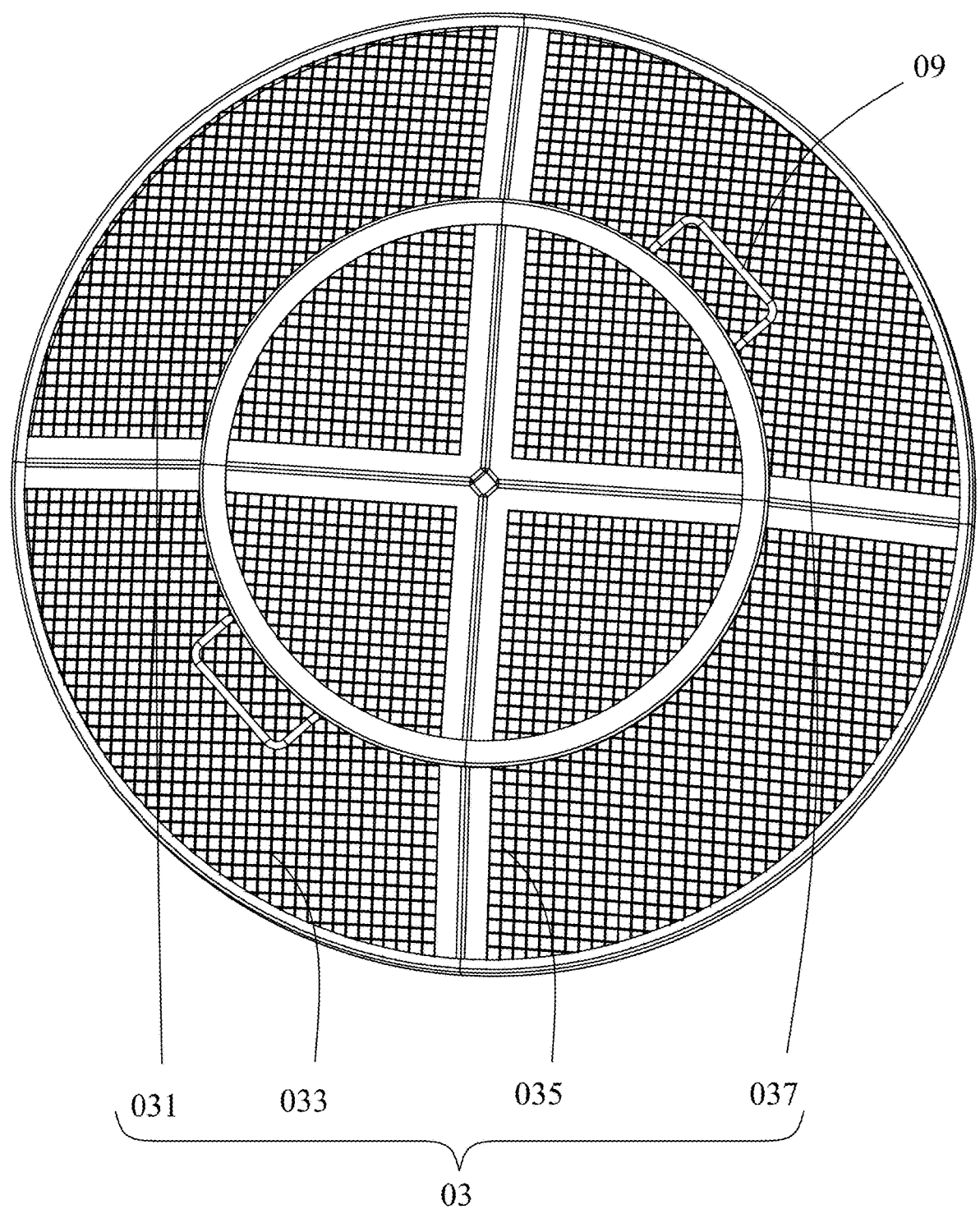
FIG. 9 is a structural diagram of another brazier lid from a first perspective according to the application.

Refer to FIGS. 9. 10, 11 and 12, which are respectively a structural diagram of another brazier lid from a first perspective according to the application, a structural diagram of another brazier lid from a second perspective, a disassembled structural diagram of another brazier lid, and a structural diagram of another brazier lid from a third perspective. In this embodiment, the brazier lid 03 comprises a first assembly 031 and a second assembly 033.

The brazier lid 03 comprises the first assembly 031 and the second assembly 033, and the first assembly 031 and the second assembly 033 are assembled together. In some embodiments, in the assembly process of the first assembly 031 and the second assembly 033, the first assembly 031 and the second assembly 033 are connected by means of some connecting components. For example, a plurality of first through-holes 0311 are formed in the first assembly 031, second through-holes 0331 are formed in the second assembly 033, the first through-holes 0311 correspond to the second through-holes 0331 in position, and external screws 07 sequentially penetrate through the first through-holes 0311 and the second through-holes 0331 to assemble together the first assembly 031 and the second assembly 033.

Wherein, the first assembly 031 further comprises a first horizontal edge frame 0316 which is connected to a first side edge frame 0317, and the first horizontal edge frame 0316 and the first side edge frame 0317 may be connected by welding, riveting, threaded connection, fixed clamping, interference fit or other methods. In this embodiment, the first horizontal edge frame 0316 and the first side edge frame 0317 are connected preferably by welding. The first horizontal edge frame 0316 divides a first area 0319 into two areas, wherein one of the two areas is a first flat surface 0312 defined by the first side edge frame 0317 and the first horizontal edge frame 0316, and the other area is a first side surface 0314 defined by a first bottom edge frame 0315, the first side edge frame 0317 and the first horizontal edge frame 0316; the positions of the first flat surface 0312 and the first side surface 0314 overlap with the position of a first mesh unit 0313.

In this embodiment, the first horizontal edge frame 0316 and the first mesh unit 0312 are fixedly connected by welding, riveting, threaded connection, fixed clamping, interference fit or other methods. In this embodiment, welding is adopted, welds are arranged between the first horizontal edge frame 0316 and the first mesh unit 0313, and the first horizontal edge frame 0316 and the first mesh unit 0313 are fixedly connected by welding.

In this embodiment, the first side surface 0314 is a curved surface, and the first flat surface 0312 is a plane.

In this embodiment, the brazier lid 03 further comprises the second assembly 033, and the structure of the second assembly 033 is basically the same as the structure of the first assembly 031. The second assembly 033 comprises a second mesh unit 0333 and a second frame unit, wherein the second frame unit may be divided into a second bottom edge frame 0335 and a second side edge frame 0337, the second bottom edge frame 0335 and the second side edge frame 0337 are connected to form a second area 0339, the second mesh unit 0333 is arranged in the second area 0339, an edge of the second mesh unit 0333 is connected to the second frame unit, and specifically, an outer edge of the second mesh unit 0333 is surrounded by the second bottom edge frame 0335 and the second side edge frame 0337. Wherein, the second bottom edge frame 0335 and the second side edge frame 0337 may be connected by welding, riveting, threaded connection, fixed clamping, interference fit or other methods. The second bottom edge frame 0335 and the second side edge frame 0337 are connected by any one of these methods to surround the second mesh unit 0333. In a preferred embodiment of the application, the second bottom edge frame 0335 and the second side edge frame 0337 are welded together and may be welded to the second mesh unit 0333, welds are arranged on edges of the second bottom edge frame 0335, the second side edge frame 0337 and the second mesh unit 0333, and the second bottom edge frame 0335, the second side edge frame 0337 and the second mesh unit 0333 welded together by electric welding.

The second assembly 033 further comprises a second horizontal edge frame 0336 which is connected to the second side edge frame 0337, and the second horizontal edge frame 0336 and the second side edge frame 0337 may be connected by welding, riveting, threaded connection, fixed clamping, interference fit or other methods. In this embodiment, the second horizontal edge frame 0336 and the second side edge frame 0337 are connected preferably by welding. The second horizontal edge frame 0336 divides the second area 0339 into two areas, wherein one of the two areas is a second flat surface 0332 defined by the second side edge frame 0337 and the second horizontal edge frame 0336, and the other area is a second side surface 0334 defined by the second bottom edge frame 0335, the second side edge frame 0337 and the second horizontal edge frame 0336; and the positions of the second flat surface 0332 and the second side surface 0334 overlap with the position of the second mesh unit 0333.

It should be noted that the first horizontal edge frame 0316 and the second horizontal edge frame 0336 are used for fixing the shape of the first mesh unit 0313 and the shape of the second mesh unit 0333, such that the first mesh unit 0313 and the second mesh unit 0333 are unlikely to deform.

In this embodiment, the second horizontal edge frame 0336 and the second mesh unit 0333 are fixedly connected by welding, riveting, threaded connection, fixed clamping, interference fit or other methods. In this embodiment, welding is adopted, welds are arranged between the second horizontal edge frame 0336 and the second mesh unit 0333, and the second horizontal edge frame 0336 and the second mesh unit 0333 are fixedly connected by welding.

In this embodiment, the first assembly 031 and the second assembly 033 may be detachably connected, wherein the first side edge frame 0317 and the second side edge frame 0337 are arranged opposite to each other and detachably connected to realize detachable connection between the first assembly 031 and the second assembly 033. A plurality of first through-holes 0311 are formed in the first side edge frame 0317, second through-holes 0331 are formed in the second side edge frame 0337, the first through-holes 0311 correspond to the second through-holes 0331 in position, and external screws 07 sequentially penetrate through the first through-holes 0311 and the second through-holes 0331 to assemble together the first assembly 031 and the second assembly 033.

In addition, the brazier lid 03 further comprises a third assembly 035 and a fourth assembly 037. Wherein, the first assembly 031, the second assembly 033, the third assembly 035 and the fourth assembly 037 are assembled together. In the assembly process of the first assembly 031 and the second assembly 033, the first assembly 031 and the second assembly 033 are connected by means of some connecting components. In this embodiment, a plurality of first through-holes 0311 are formed in the first assembly 031, second through-holes 0331 are formed in the second assembly 033, third through-holes are formed in the third assembly 035, and fourth through-holes are formed in the fourth assembly 037. The first through holes 0311, the second through-holes 0331, the third through-holes and the fourth through-holes correspond to one another in position, and external screws 07 sequentially penetrate through the first through-holes 0311, the second through-holes 0331, the third through-holes and the fourth through-holes to assemble together the first assembly 031, the second assembly 033, the third assembly 035 and the fourth assembly 037.

It should be noted that the first through-holes 0311, the second through-holes 0331, the third through-holes and the fourth through-holes are formed in edges of the first assembly 031, the second assembly 033, the third assembly 035 and the fourth assembly 037. Wherein, the number of the first through-holes 0311, the number of the second through-holes 0331, the number of the third through-holes and the number of the fourth through-holes are greater than or equal to 3. The structure of the first assembly 031, the second assembly 033, the third assembly 035 and the fourth assembly 037 is identical with the specific structure of the first assembly 031 in FIG. 4, and the specific structure of the second assembly 033, the third assembly 035 and the fourth assembly 037 is approximately the same as the specific structure of the first assembly 031.

Specifically, in the assembly process of the brazier lid 03 in this embodiment, a plurality of first through-holes 0311 are formed in the first side edge frame 0317, and second through holes 0331 are formed in the second side edge frame 0337; similarly, third through-holes are formed in the third side edge frame, and fourth through-holes are formed in the fourth side edge frame; the first through-holes 0311, the second through holes 0331, the third through-holes and the fourth through-holes correspond to one another in position; and external screws 07 penetrate through the first through-holes 0311, the second through-holes 0331, the third through-holes and the fourth through-holes to assemble together the first assembly 031, the second assembly 033, the third assembly 035 and the fourth assembly 037.

After the first assembly 031, the second assembly 033, the third assembly 035 and the fourth assembly 037 are assembled together, the first bottom edge frame 0315, the second bottom edge frame 0335, the third bottom edge frame and the fourth bottom edge frame are assembled together to define a plane, which is approximately a circular plane; in an extension direction close to the second side edge frame 0337 and the first side edge frame 0317, the area of the plane decreases gradually; in other words, in an extension direction away from the brazier body 05, the area of the plane decreases gradually to be close to a non-zero fixed value finally. In this case, the whole brazier lid 03 is configured as a truncated cone-shaped structure formed by the first assembly 031, the second assembly 033, the third assembly 035 and the fourth assembly 037.

In this embodiment, in the assembly process of the first assembly 031, the second assembly 033, the third assembly 035 and the fourth assembly 037, each of the first assembly 031, the second assembly 033, the third assembly 035 and the fourth assembly 037 accounts for a quarter of a top surface 09, that is, the angle of the first assembly 031, the angle of the second assembly 033, the angle of the third assembly 035 and the angle of the fourth assembly 037 are respectively 90° respectively. Specifically, in this embodiment, a plane defined by the first bottom edge frame 0315 and the second bottom edge frame 0335 is defined as a bottom surface 04, and a plane defined by the second horizontal edge frame 0336 and the first horizontal edge frame 0316 is defined as the top surface 09. The bottom surface 04 and the top surface 09 are approximately circular and designed into concentric circles, and the area of the bottom surface 04 is greater than the area of the top surface 09. In this way, an included angle is formed between the first flat surface 0312 and the first side surface 9314 along the first horizontal edge frame 0316, and the included angle is an obtuse angle, that is, the included angle is greater than 90° and less than 180°.

In another embodiment of the application, the area of the top surface 09 is equal to the area of the bottom surface 04, and in this case, an included angle is formed between the first flat surface 0312 and the first side surface 0314 along the first horizontal edge frame 0316, and the included angle is 90°.

Figure 10:
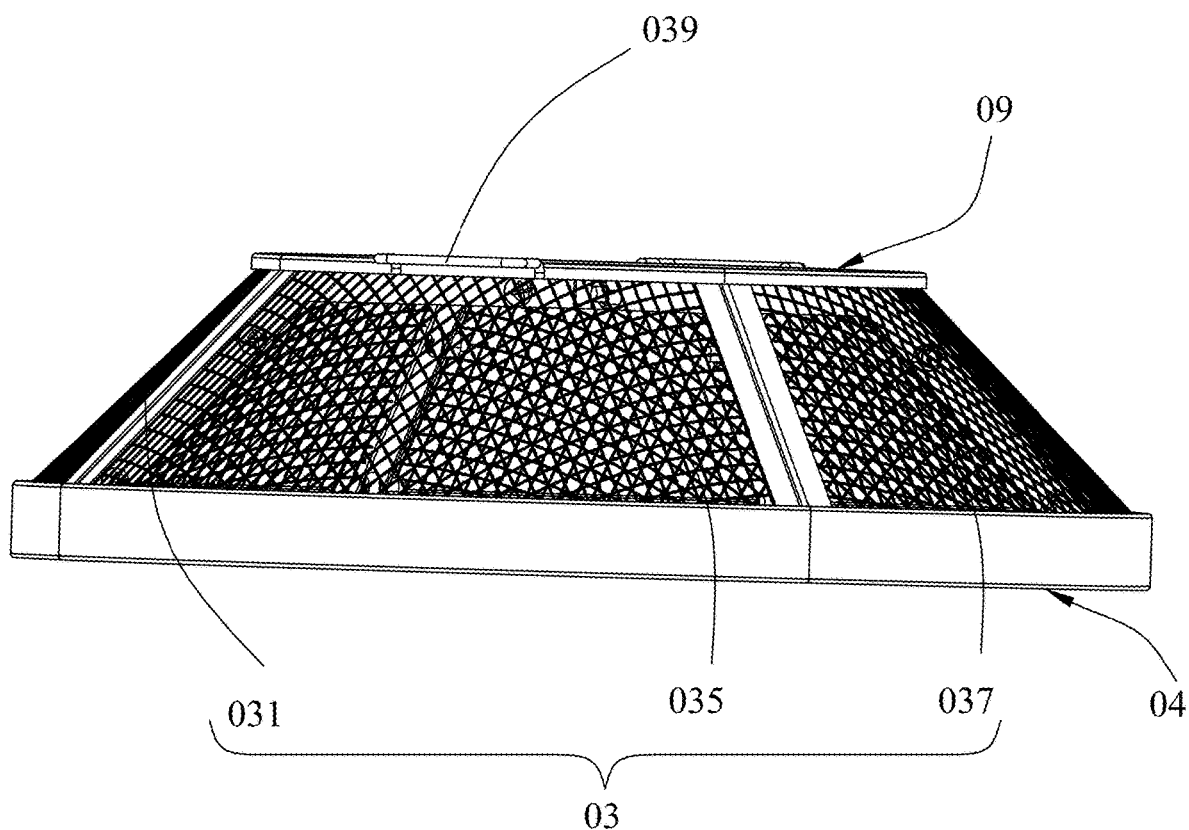
FIG. 10 is a disassembled structural diagram of another brazier lid from a second perspective according to the application.
Figure 11:
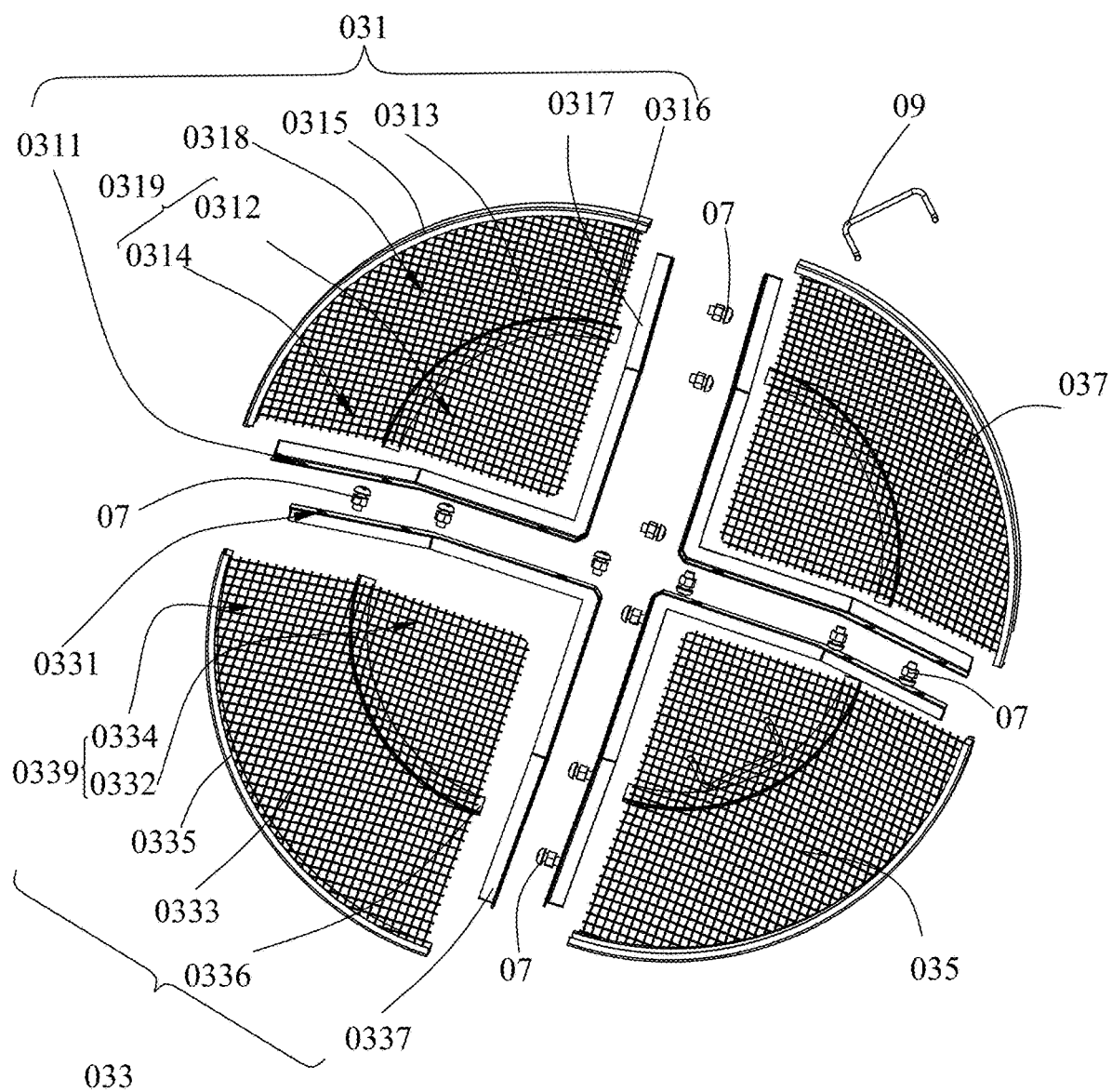
FIG. 11 is a disassembled structural diagram of another brazier lid according to the application.

Referring to FIGS. 9 and 10, in another embodiment of the application, a plane defined by the first bottom edge frame 0315 and the second bottom edge frame 0335 is defined as a bottom surface 04, and a plane defined by the second horizontal edge frame 0336 and the first horizontal edge frame 0316 is defined as a top surface 09.

On this basis, the bottom surface 04 and the top surface 09 are polygonal; for example, the bottom surface 04 and the top surface 09 are triangular, quadrilateral, pentagonal, or hexagonal. In addition, the bottom surface and the top surface may be in some irregular planar shapes, which will not be enumerated here.

In a case where the bottom surface 04 and the top surface 09 are polygonal, the first side surface 0314 should be a plane accordingly, and the bottom surface 04 and the top surface 09 are concentric triangles, quadrangles, pentagons, hexagons or other polygons. In actual use, the bottom surface 04 covers the brazier body 05, and articles are placed on the top surface 09 to be used for barbecuing or heating.

In some application scenarios, some braking trays, pans or other cooking utensils may be placed on the top surface 09 to be used for heating food.

In other embodiments (not shown) of the application, the brazier lid 03 only comprises a first assembly 031, a second assembly 033 and a third assembly 035, and the structure of the third assembly 035 is almost the same as the structure of the first assembly 031 and the second assembly 033 and will not be detailed here.

The first assembly 031, the second assembly 033 and the third assembly 035 are assembled together to form the shape of the brazier lid, wherein the first assembly 031, the second assembly 033 and the third assembly 035 may be assembled together by screw connection, riveting, interference fit or clamping. In this embodiment, the first assembly 031, the second assembly 033 and the third assembly 035 are connected with screws. It should be noted that in the assembly process of the first assembly 031, the second assembly 033 and the third assembly 035, the first assembly 031, the second assembly 033 and the third assembly 035 have basically the same size and form a bottom surface jointly. Wherein, in the assembly process of the first assembly 031, the second assembly 033 and the third assembly 035, each of the first assembly 031, the second assembly 033 and the third assembly 035 accounts for one third of a top surface, that is, the angle of the first assembly 031, the angle of the second assembly 033 and the angle of the third assembly 035 are respectively 120°.

Similarly, in a case where a bottom surface and a top surface of the brazier lid 03 are formed by a first assembly 031 and a second assembly 033, in the assembly process of the first assembly 031 and the second assembly 033, each of the first assembly 031 and the second assembly 033 accounts for half of the top surface, that is, the angle of the first assembly 031 and the angle of the second assembly 033 are respectively 180°.

The brazier lid 03 in the application may further comprise a fifth assembly and/or a sixth assembly, the structure of which is identical with the structure of the first assembly 031 or the second assembly 033. In a case where the brazier lid 03 further comprises the fifth assembly, each assembly accounts for one fifth the top surface, and the angle of each assembly on the top surface is 72°. In a case where the brazier lid 03 further comprises the fifth assembly and the sixth assembly, each assembly accounts for one sixth of the top surface, and the angle of each assembly on the top surface is 60°.

Figure 12:
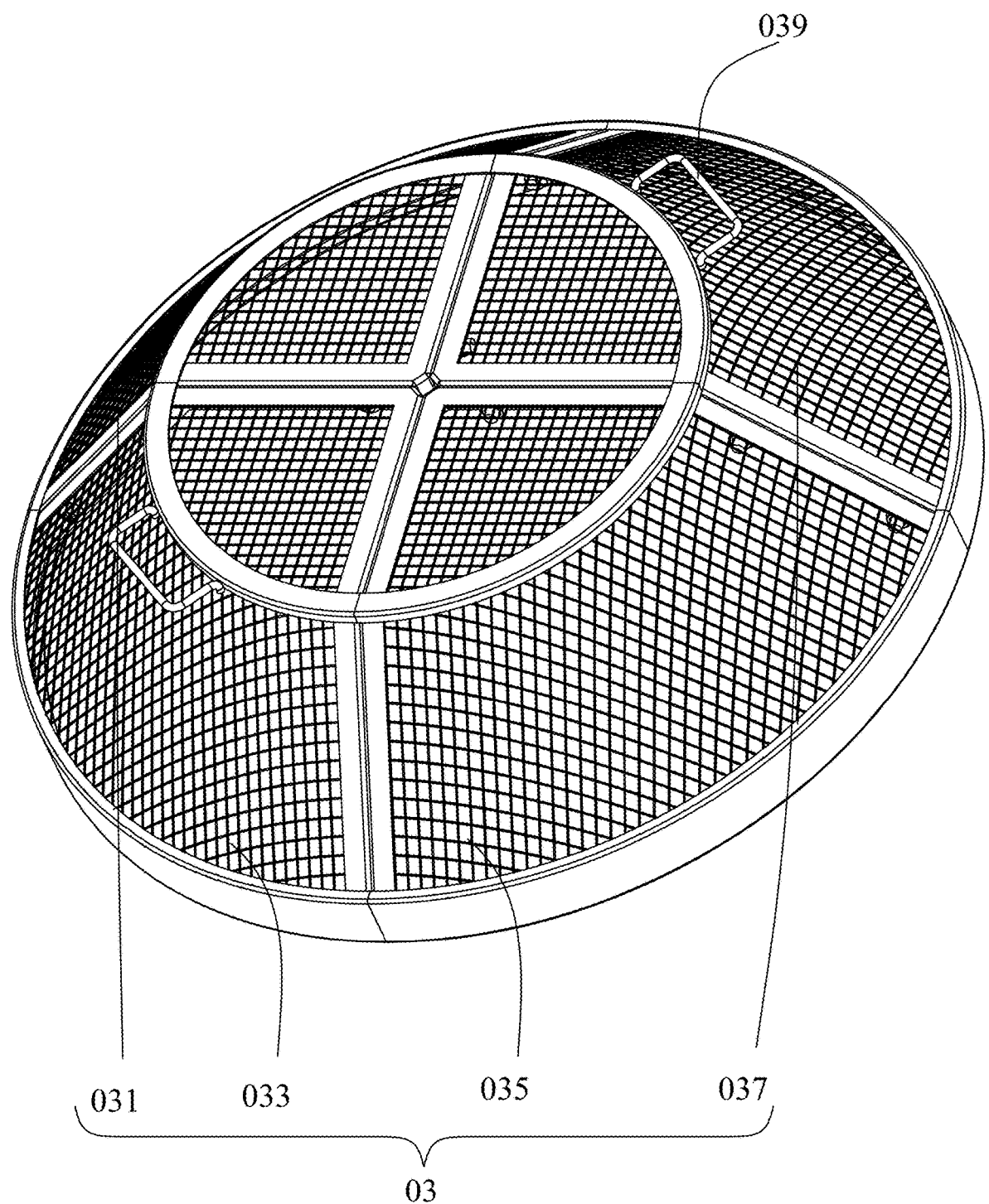
FIG. 12 is a structural diagram of another brazier lid from a third perspective according to the application.

Referring to FIG. 3, 7 or 12, in the above embodiments of the application, the brazier lid 03 further comprises a handle 039, which is arranged on the first bottom edge frame 0315, the first side edge frame 0317 or the first horizontal edge frame 0316, wherein a ring structure is formed between the handle 039 and the first bottom edge frame 0315; or, a ring structure is formed between the handle 039 and the first side edge frame 0317; or, a ring structure is formed between the handle 039 and the first horizontal edge frame 0316.

The handle 039 is an independent external component and comprises a handle ring 0391 and a connecting component 0393, wherein the handle ring 0391 is an independent ring structure and is used for lifting up an external component or placing the brazier lid 03, and the connecting component 0393 is connected to the brazier lid 03. Wherein, the connecting component 0393 may be connected to the brazier lid 03 by welding, screw connection, clamping, interference fit, riveting or other methods. In a preferred embodiment of the application, the connecting component 0393 is connected to the brazier lid 03 by means of screws.

Figure 13:
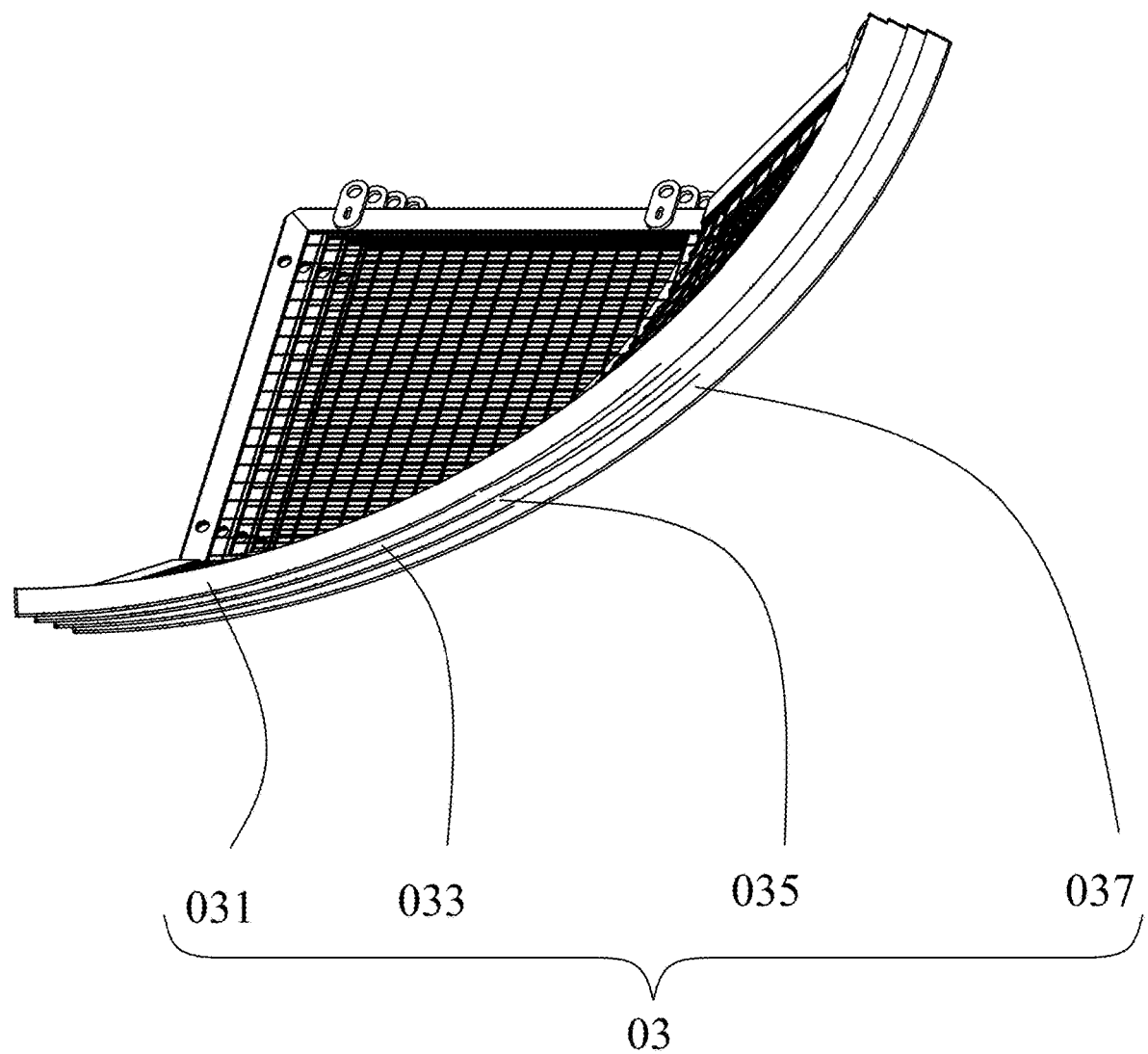
FIG. 13 is a structural diagram of the brazier lid in a stacked state from a first perspective according to the application.
Figure 14:
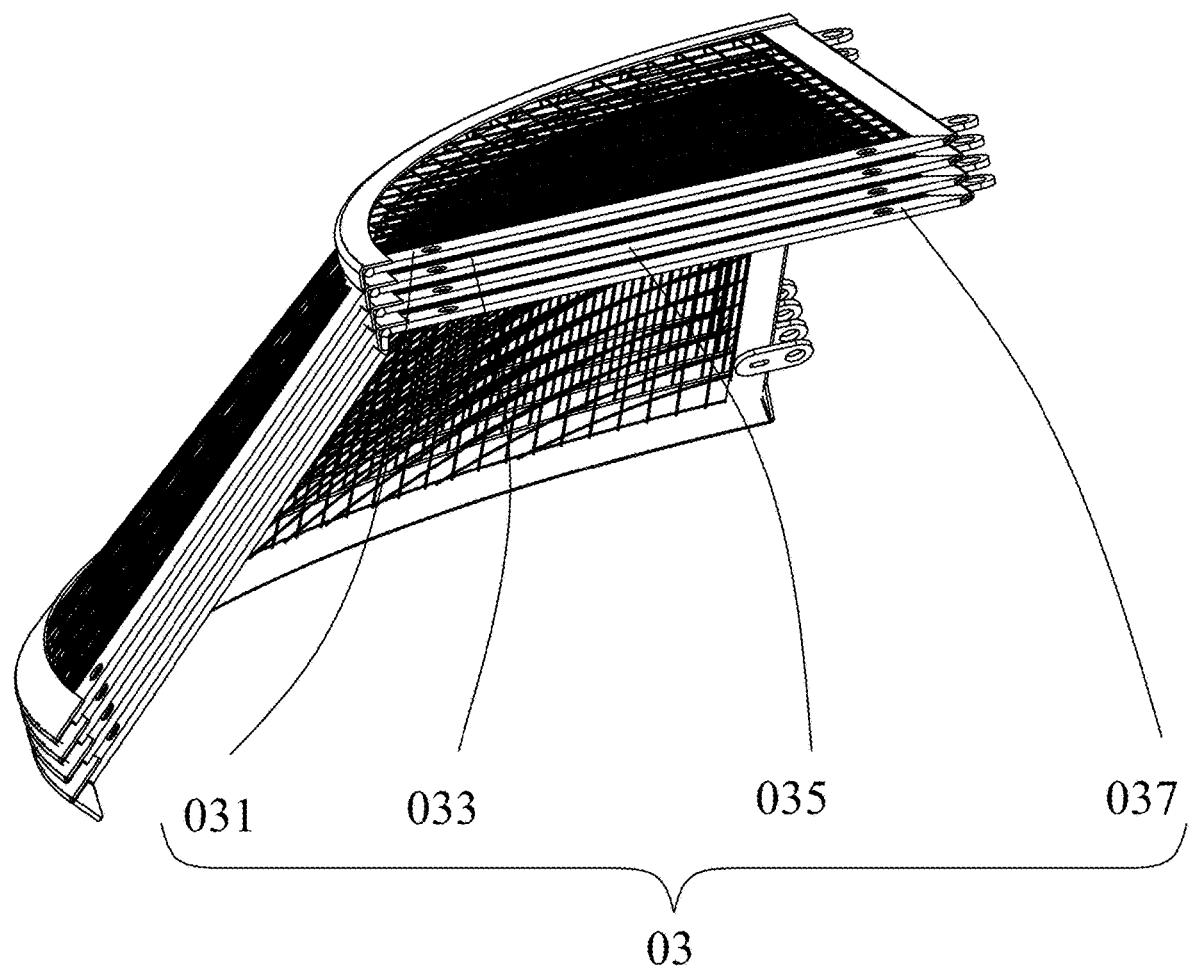
FIG. 14 is a structural diagram of the brazier lid in a stacked state from a second perspective according to the application.
Figure 15:
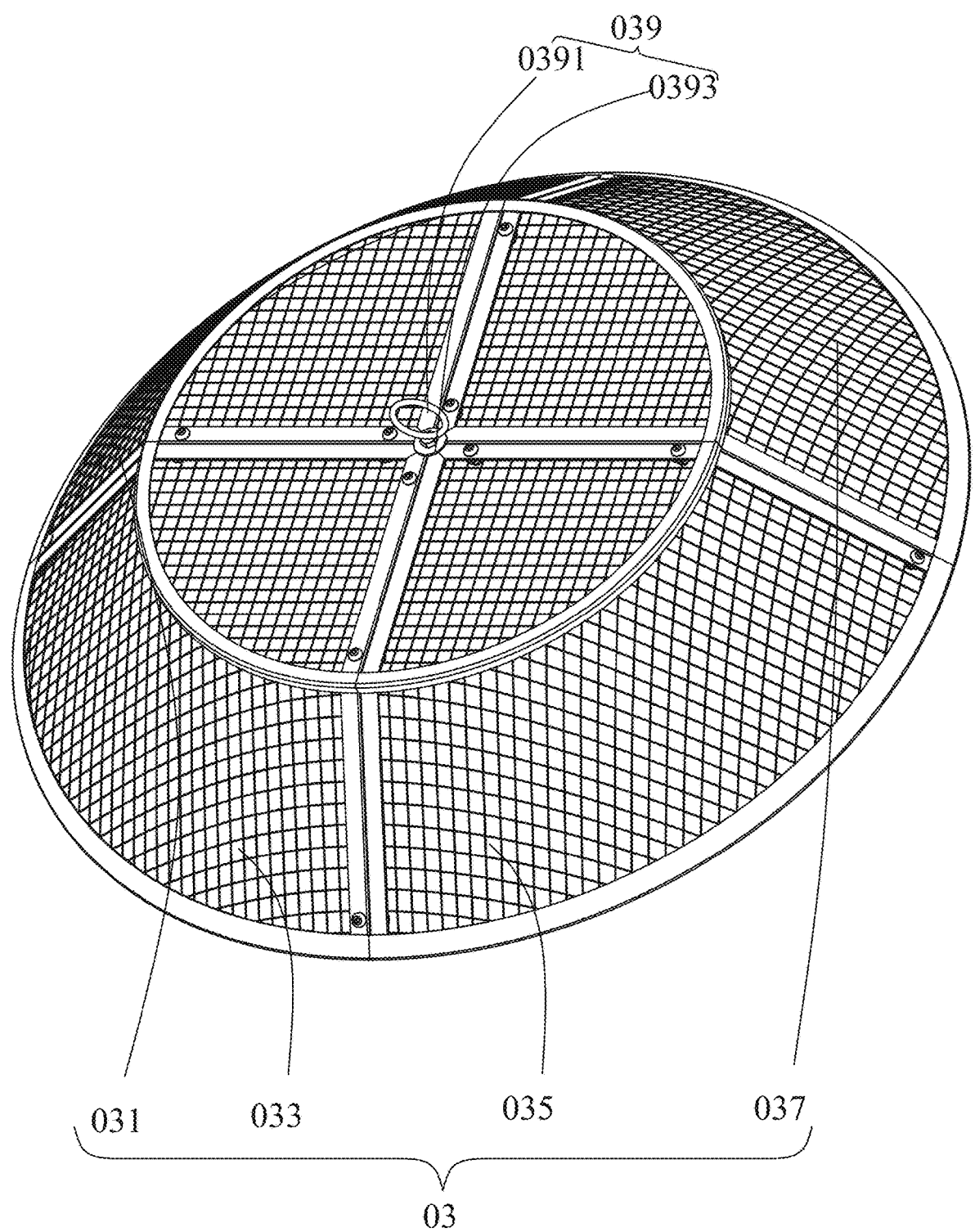
FIG. 15 is a structural diagram of another brazier lid according to the application.

Refer to FIGS. 13 and 14, which are respectively a structural diagram of the brazier lid in a stacked state from a first perspective according to the application and a structural diagram of the brazier lid in a stacked state from a second perspective according to the application and illustrate a stacked state of the brazier lid 03 in the storage, sales and transportation process, wherein the first assembly 031, the second assembly 033, the third assembly 035 and the fourth assembly 037 are stacked from top to bottom, such that the space occupied by the brazier lid 03 is greatly reduced. Compared with traditional brazier lids, the brazier lid 02 in the application can be disassembled to reduce the size of the whole brazier lid. For example, as shown in FIGS. 14 and 15, in a case where the brazier lid 03 is disassembled into the first assembly 031, the second assembly 033, the third assembly 035 and the fourth assembly 037, the size of the whole brazier lid is reduced almost to a quarter. Similarly, in a case where the brazier lid comprises the first assembly 031, the second assembly 033 and the third assembly 035, the size of the whole brazier lid is reduced almost to one third. Similarly, in a case where the brazier lid comprises the first assembly 031 and the second assembly 033, the size of the whole brazier lid is reduced almost to half.

Referring to FIG. 15 which is a structural diagram of another brazier lid according to the application, the brazier lid 03 further comprises a third assembly 035 and a fourth assembly 037. Wherein, the first assembly 031, the second assembly 033, the third assembly 035 and the fourth assembly 037 are detachably connected. In the assembly process of the first assembly 031, the second assembly 033, the third assembly 035 and the fourth assembly 037, the first assembly 031, the second assembly 033, the third assembly 035 and the fourth assembly 037 are detachably connected by means of screws, and external screws 07 sequentially penetrate through first through-holes 0311, second through-holes 0331, third through-holes and fourth through-holes to assemble together the first assembly 031, the second assembly 033, the third assembly 035 and the fourth assembly 037. In this embodiment, the handle 039 is an independent external component and comprises a handle ring 0391 and a connecting component 0393, wherein the handle ring 0391 is an independent ring structure and is used for lifting up an external component or placing the brazier lid 03, and the connecting component 0393 is connected to the brazier lid 03. Wherein, the connecting component 0393 may be connected to the brazier lid 03 by welding, screw connection, clamping, interference fit, riveting or other methods. In a preferred embodiment of the application, the connecting component 0393 is connected to the brazier lid 03 by means of screws.

The embodiments of the application are described above. It should be noted here that those ordinarily skilled in the art can make improvements without deviating from the inventive concept of the application, and all these improvements should also fall within the protection scope of the application.

What is claimed is:

1. A brazier lid, being used for covering a brazier body, and comprising:
   a first assembly, comprising:
      a first frame unit, comprising:
         a first bottom edge frame;

a first side edge frame, the first bottom edge frame and the first side edge frame being connected to form a first area; and a first horizontal edge frame, connected to the first side edge frame; a first flat surface is defined by the first side edge frame and the first horizontal edge frame, a first side surface is defined by the first bottom edge frame, the first side edge frame and the first horizontal edge frame, positions of the first flat surface and the first side surface overlap with a position of the first mesh unit; and a first mesh unit, the first mesh unit being arranged in the first area, and the edges of the first mesh unit being connected to the first frame unit;

a second assembly, comprising:

a second frame unit, comprising:

a second bottom edge frame;

a second side edge frame, the second bottom edge frame and the second side edge frame being connected to form a second area; and a second mesh unit, the second mesh unit being arranged in the second area, and the edges of the second mesh unit being connected to the second frame unit;

a third assembly, comprising:

a third frame unit, comprising:

a third bottom edge frame; and a third side edge frame, the third bottom edge frame and the third side edge frame being connected to form a third area; and a third mesh unit, the third mesh unit being arranged in the third area, and the edges of the third mesh unit being connected to the third frame unit; and a fourth assembly, comprising:

a fourth frame unit, comprising:

a fourth bottom edge frame; and a fourth side edge frame, the fourth bottom edge frame and the fourth side edge frame being connected to form a fourth area; and a fourth mesh unit, the fourth mesh unit being arranged in the fourth area, and an edge of the fourth mesh unit being connected to the fourth frame unit;

wherein, the first side edge frame and the second side edge frame are arranged opposite to each other and detachably connected to realize detachable connection between the first assembly and the second assembly;

wherein, the third side edge frame, the first side edge frame and the second side edge frame are detachably connected to realize detachable connection between the first assembly, the second assembly and the third assembly;

wherein, the fourth side edge frame, the third side edge frame, the second side edge frame and the first side edge frame are detachably connected to realize detachable connection between the first assembly, the second assembly, the third assembly and the fourth assembly;

wherein, the first horizontal edge frame divides the first area into two areas, wherein one of the two areas is a first flat surface defined by the first side edge frame and the first horizontal edge frame, and the other area is a first side surface defined by the first bottom edge frame, the first side edge frame and the first horizontal edge frame; the positions of the first flat surface and the first side surface overlap with the position of the first mesh unit, and the first side surface is a curved surface, and the first flat surface is a plane;

wherein, the specific structure of the second assembly, the third assembly and the fourth assembly is approximately the same as the specific structure of the first assembly;

wherein an included angle is formed between the first flat surface and the first side surface along the first horizontal edge frame, and the included angle ranges is 90°.

2. The brazier lid according to claim 1, wherein the first bottom edge frame and the second bottom edge frame are connected end-to-end to form a plane; in an extension direction close to the second side edge frame and the first side edge frame, an area of the plane decreases gradually.

3. The brazier lid according to claim 2, further comprising:

a handle, arranged on the first bottom edge frame, the first side edge frame or the first horizontal edge frame.

4. A brazier, comprising:

a brazier lid, being used for covering the brazier body and comprising:

a first assembly, comprising:

a first frame unit, comprising:

a first bottom edge frame;

a first side edge frame, the first bottom edge frame and the first side edge frame being connected to form a first area; and a first horizontal edge frame, connected to the first side edge frame; a first flat surface is defined by the first side edge frame and the first horizontal edge frame, a first side surface is defined by the first bottom edge frame, the first side edge frame and the first horizontal edge frame, positions of the first flat surface and the first side surface overlap with a position of the first mesh unit; and a first mesh unit, the first mesh unit being arranged in the first area, and the edges of the first mesh unit being connected to the first frame unit;

a second assembly, comprising:

a second frame unit, comprising:

a second bottom edge frame; and a second side edge frame, the second bottom edge frame and the second side edge frame being connected to form a second area; and a second mesh unit, the second mesh unit being arranged in the second area, and the edges of the second mesh unit being connected to the second frame unit;

a third assembly, comprising:

a third frame unit, comprising:

a third bottom edge frame; and a third side edge frame, the third bottom edge frame and the third side edge frame being connected to form a third area; and a third mesh unit, the third mesh unit being arranged in the third area, and the edges of the third mesh unit being connected to the third frame unit;

a fourth assembly, comprising:

a fourth frame unit, comprising:

a fourth bottom edge frame; and a fourth side edge frame, the fourth bottom edge frame and the fourth side edge frame being connected to form a fourth area; and a fourth mesh unit, the fourth mesh unit being arranged in the fourth area, and an edge of the fourth mesh unit being connected to the fourth frame unit;

the first side edge frame and the second side edge frame being arranged opposite to each other and detachably connected to realize detachable connection between the first assembly and the second assembly; and the brazier body, comprising:

side walls, a cylindrical space being defined by the side walls; and a bottom, the bottom being connected to lower edges of the side walls, and a combustion area being defined by the bottom and the side walls;

wherein, an open smoke outlet area is defined by upper portions of the side walls;

the brazier lid covers the open smoke outlet area defined by the upper portions of the side walls and is detachably connected to the brazier body;

wherein, the third side edge frame, the first side edge frame and the second side edge frame are detachably connected to realize detachable connection between the first assembly, the second assembly and the third assembly;

wherein, the fourth side edge frame, the third side edge frame, the second side edge frame and the first side edge frame are detachably connected to realize detachable connection between the first assembly, the second assembly, the third assembly and the fourth assembly;

wherein, the first horizontal edge frame divides the first area into two areas, wherein one of the two areas is a first flat surface defined by the first side edge frame and the first horizontal edge frame, and the other area is a first side surface defined by the first bottom edge frame, the first side edge frame and the first horizontal edge frame; the positions of the first flat surface and the first side surface overlap with the position of the first mesh unit, and the first side surface is a curved surface, and the first flat surface is a plane;

wherein, the specific structure of the second assembly, the third assembly and the fourth assembly is approximately the same as the specific structure of the first assembly;

wherein an included angle is formed between the first flat surface and the first side surface along the first horizontal edge frame, and the included angle ranges is 90°.

5. The brazier according to claim 4, wherein the first bottom edge frame and the second bottom edge frame are connected end-to-end to form a plane; in an extension direction away from the brazier body, an area of the plane decreases gradually.

* * * * *